United States Patent [19]
Kemper

[11] Patent Number: 5,024,760
[45] Date of Patent: Jun. 18, 1991

[54] EASILY REMOVABLE OIL FILTER

[75] Inventor: John J. Kemper, 5512 Sara Dr., Torrance, Calif. 90503

[73] Assignee: John Joseph Kemper, Torrance, Calif.

[21] Appl. No.: 473,636

[22] Filed: May 24, 1990

[51] Int. Cl.⁵ .............................................. B01D 27/00
[52] U.S. Cl. ..................... 210/232; 210/443; 210/444; 210/470; 210/DIG. 17; 210/440; 123/196 A; 184/6.24
[58] Field of Search ............... 210/443, 232, 444, 440, 210/238, 470, DIG. 17, 186; 123/196 A; 184/6.24

[56] References Cited
U.S. PATENT DOCUMENTS 3,262,570  7/1966  Gailitis et al. ................. 210/444
4,364,829 12/1982  Atkins et al. .................. 210/238
4,465,595  9/1984  Cooper ......................... 210/238
4,865,727  9/1989  Krauss ......................... 210/168

FOREIGN PATENT DOCUMENTS 127010  6/1945  Australia .

Primary Examiner—W. Gary Jones
Assistant Examiner—David Reifsnyder

[57] ABSTRACT

The addition of bracket type fins to the current design of internal combustion engine replaceable oil filters to enable the manual removal of the oil filter at the interval replacement time without the use of an oil filter wrench is the main point of my new design. The brackets can easily be added to current oil filter designs without substantially increasing production cost. This new design is for use with all sizes and types of engine oil filters.

5 Claims, 1 Drawing Sheet

EASILY REMOVABLE OIL FILTER

FIELD OF THE INVENTION

This invention relates to internal combustion engine replaceable oil filters used primarily in automotive applications. Most automotive manufacturers recommend replacing the oil filter at least every 6,000 miles. The oil filter removes carbon and other foreign material from the lubrication oil to reduce friction in the internal moving parts of gasoline engines.

Current replaceable oil filters require the use of an oil filter wrench to remove the filter at replacement intervals. This new design will eliminate the need for an oil filter wrench to remove the filter and instead have brackets to enable the filter to be removed by hand, even when covered with oil, as most oil filters are at replacement time.

The current oil filter removing tool requires more room and often slips around before a firm grip can be maintained upon the cylindrical oil filter body. In some imported cars, the engine must actually be removed in order to use the oil filter wrench. This new design will eliminate the need for any filter removing tools, as are currently required, and add little to the production cost of most oil filters. This invention does not change any of the inner filtration designs, only the outer body shape, and this concept may be used for all types and sizes of oil filters.

DESCRIPTION OF PRIOR ART

There is no previous design quite like the new Easily Removable Oil Filter. Some of the attributes distinguishing it from prior art are as follows:

This design differs from the Atkins (U.S. Pat. No. 4,364,829) design in that no attachment device is needed, and the amount of necessary material is substantially reduced, including the elimination of any hinge type devices. The brackets are also permanently attached and not interchangeable with other filters unlike the Atkins patent.

This design differs from the Krauss (U.S. Pat. No. 4,865,727) design in that no extra filter container is required and is very much different in outer filter structure.

This design differs from the Cooper (U.S. Pat. No. 4,465,595) design in that no screwdriver is required to remove the oil filter and the brackets are permanently attached and quite different, not a screw on leak reducer device as in the Cooper patent.

My new oil filter design is unique to past ideas and enables the easy removal of internal combustion engine oil filters by hand by providing gripping brackets similar to the invention of the wing nut, but applied to the twist off oil filter element itself.

SUMMARY OF THE INVENTION

The object is quite simple, to provide for the removal of internal combustion engine oil filters by hand without the need for any large slippery tools as currently required. This will make periodic engine maintainence easier and encourage drivers to change their filters more often. Cleaner oil makes the engine more efficient and less polluting and also increases the life expectancy of the engine.

DESCRIPTION OF THE PREFERRED EMBODIMENT

Figure 1:
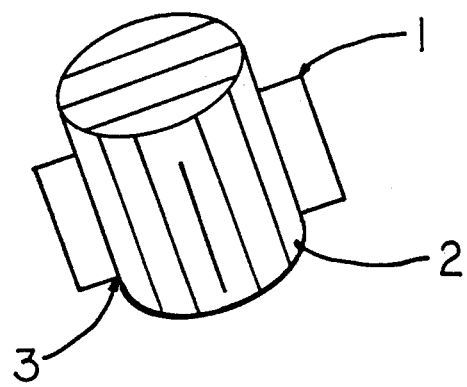
FIG. 1—Three-Dimensional Assembled View FIG. 2—Top View Unassembled FIG. 3—Top View Assembled FIG. 4—Side View Unassembled FIG. 5—Side View Assembled Within each of the figures, the numbered parts are as follows: Number 1—Gripping Edge of the Bracket Number 2—The Oil Filter Itself Number 3—Bracket Attachment Edge
Figure 2:
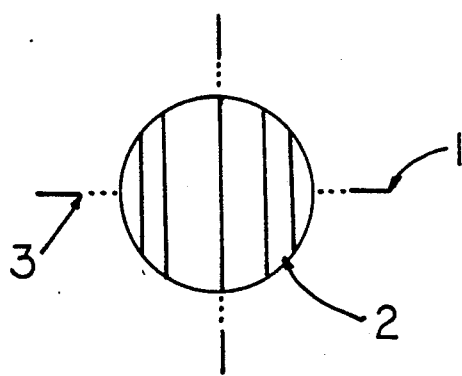
Figure 3:
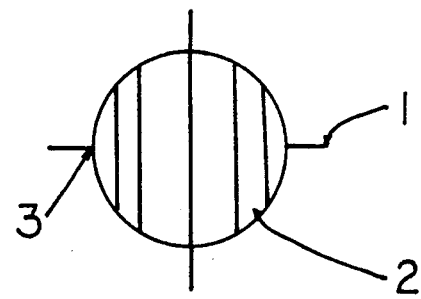
Figure 4:
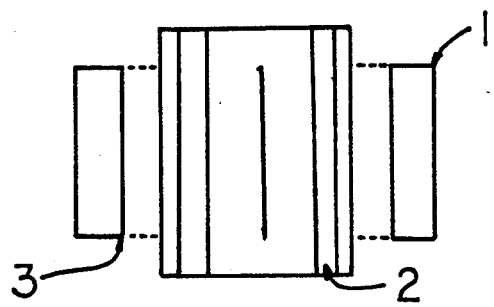
Figure 5:
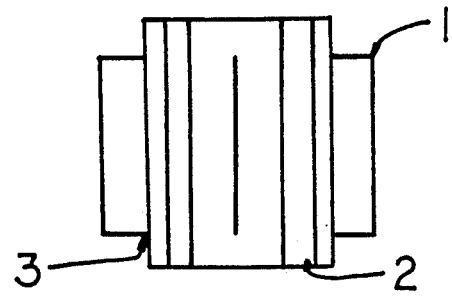

Most replaceable oil filters for internal combustion engines are cylindrical in shape and varying in size, usually in proportion with the engine size it is used on. This design is for all oil filter sizes and types and does not change the inner filtration apparatus.

The brackets 1 can vary in size from approximately 0.5 inch to 1 inch and the length of the brackets is approximately $\frac{3}{4}$ of the length of the filter body 2.

The recommended amount of bracket may vary from 1-30 preferably 4, spaced equally around the cylindrical filter body.

Many forms of attachment can be utilized including molding the shape of the brackets into the filter body, welding, soldering, gluing, bolting, riveting or spot welding but spot welding is preferred as the most economical and strongest way to permanently bond the brackets to the filter surface 3.

Any suitable material may be used to form the brackets as long as it can withstand the torque applied during the filter installation and removal process. The preferred material is the same material as the filter body.

Although the invention has been disclosed in terms of a preferred embodiment, it should be understood that numerous modifications and variations could be made thereto without departing from the true spirit and scope thereof as defined by the following claims.

I claim:

1. In an oil automotive filter comprising an outer filter body and an internal filter material wherein the improvement comprises means for enabling wrench free installation and removal of said oil filter comprising 3 or more permanently attached brackets of suitable material, said brackets being equally spaced around the circumference of said oil filter body and having a length, wherein the length of the brackets is about $\frac{3}{4}$ of the length of said filter body.

2. The apparatus of claim 1 wherein said suitable material is metal.

3. The apparatus of claim 1 wherein said suitable material is the same material as the filter body.

4. The apparatus of claim 1 wherein said brackets are attached to the filter body by welds, solder, glue, bolts or rivets.

5. The apparatus of claim 1 wherein said brackets are molded in to the surface of the filter body.

* * * * *